June 28, 1932.   C. R. ALDEN   1,864,707
SLIP BUSHING
Filed July 12, 1929

Inventor
Carroll R. Alden
By Chindahl Parker Carlson
Attys

Patented June 28, 1932

1,864,707

UNITED STATES PATENT OFFICE

CARROLL R. ALDEN, OF DETROIT, MICHIGAN, ASSIGNOR TO EX-CELL-O AIRCRAFT & TOOL CORPORATION, OF DETROIT, MICHIGAN, A CORPORATION OF MICHIGAN

SLIP BUSHING

Application filed July 12, 1929. Serial No. 377,689.

The present invention relates to improvements in slip bushings, and has particular reference to new and improved means for locking the liner and the bushing against relative continuous rotation and against relative endwise movement.

An important object of the present invention resides in the provision of a novel slip bushing having external locking means without recesses wherein dirt and chips may gather.

Another object is to provide a new and improved slip bushing having external locking means in which the bushing may be turned in either direction to effect the locking action.

Further objects and advantages will become apparent as the description proceeds.

In the accompanying drawing, Figure 1 is a fragmentary view partially in axial section of a bushing embodying the features of my invention.

Figure 1:
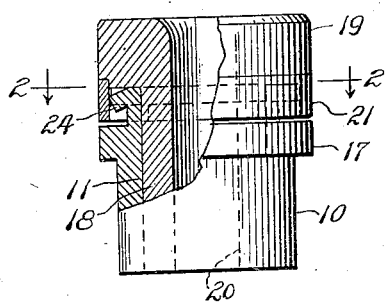
Figure 2:
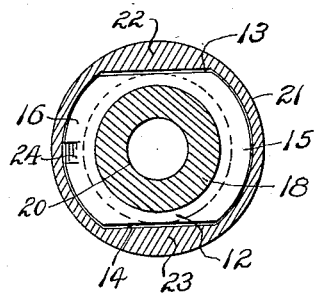
Fig. 2 is a transverse sectional view taken along line 2—2 of Fig. 1.
Figure 3:
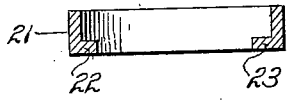
Fig. 3 is an axial sectional view of the locking ferrule on the bushing.
Figure 4:
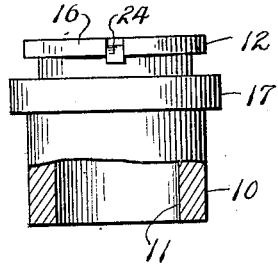
Fig. 4 is a side elevational view partially in axial section of the liner.

While the invention is susceptible of various modifications and alternative constructions I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the slip bushing constituting the exemplary embodiment of the invention comprises a suitable liner 10 which preferably is cylindrical in form, and which is formed with a central axial bore 11. Formed on the upper end of the liner 10 is a lateral locking flange which may be of any suitable form, and which in the present instance is in the form of a peripheral collar 12 flattened at opposite sides as indicated at 13 and 14 to define diametrically opposed lobes 15 and 16. Also formed on the external periphery of the liner 10, in parallel spaced relation to the collar 12, is a flange or head 17 adapted to support the liner 10 in a suitable fitting, such as a jig (not shown).

Slidably and rotatably mounted in the bore 11 is a bushing 18 provided with a head 19 bearing against the upper face of the collar 12 and formed with an axial bore 20 opening therethrough for the reception in use of a tool (not shown).

Secured to the lower end of the head 19, in any suitable manner, as for example by welding, is a depending ferrule or ring 21 which projects in concentric spaced relation about the upper end of the liner 10. The lower end of the ferrule 21 is formed with two diametrically opposed insets or flanges 22 and 23 which, with the lower end of the head 19, define a space adapted to receive the ends of the lobes 15 and 16 upon relative rotation between the liner 10 and the bushing 18. The flanges 22 and 23 and the ferrule 21 define an opening in the bottom conforming substantially in contour to and adapted when in registration therewith to receive the collar 12. It will be evident that upon relative rotation of these parts in either direction, from the position in which the opening in the lower end of the ferrule 21 and the collar 12 are in registration, will cause the lobes 15 and 16 to move into overlapping relation with the flanges 22 and 23, thereby preventing withdrawal of the bushing 18.

Means is provided for preventing continuous rotation of the bushing 18 in the liner 10, and for locating the locking parts in definite overlapping relation. While this means may vary in form and action, in the present instance it comprises an abutment on one of the locking parts projecting into the path of the other of the locking parts. Preferably, the abutment consists of a stop lug 24 struck down from the central part of the lobe 16 into position to engage selectively either of the flanges 22 and 23 at a non-wedging angle, thereby providing a "free-lock", i. e. permitting the parts to be rotated freely out of overlapping relation.

In use, the bushing is so orientated that the opening into the ferrule 21 will fit over the collar 12, and is then moved into assembled relation with the liner. The bushing now is rotated until the lug 24 abuts against one of the flanges 22 and 23, thereby bringing the lobes 15 and 16 in overlapping relation with said flanges to prevent relative endwise movement. The lug 24 provides a "free-lock", permitting the bushing to be turned freely in the opposite direction to bring the collar 12 back into registration with the opening in the ferrule 21. It will be evident that this lock may be effected upon rotation of the bushing in either direction. No upwardly opening recesses adapted to collect dirt, chips, etc., are present.

I claim as my invention:

1. A slip bushing comprising, in combination, a liner having a bore opening therethrough, a peripheral collar on the upper end of said liner, said collar being flattened at opposite sides to define two diametrically opposed lobes, a lug struck down from the center of one of said lobes, a bushing slidably and rotatably disposed in said bore, and having a head bearing against the top of said collar, a depending locking ring secured to said head and fitting about said collar, the lower end of said ring being formed with two diametrically opposed inwardly projecting ledges movable under said lobes upon rotation of said bushing in either direction and adapted selectively to engage said lug.

2. A slip bushing comprising, in combination, a liner having a bore opening therethrough, a peripheral collar on the upper end of said liner, said collar defining diametrically opposed lobes, a bushing slidably and rotatably disposed in said bore, and having a head bearing against the top of said collar, a depending locking ring secured to said head and fitting about said collar, the lower end of said ring being formed with diametrically opposed inwardly projecting ledges movable under said lobes upon rotation of said bushing in either direction, and a stop member depending from one of said lobes into the path of said ledges for engagement therewith to limit rotation of said bushing in said liner.

3. A slip bushing comprising, in combination, a liner having a bore opening therethrough, a laterally projecting flange on the upper end of said liner, a bushing slidably and rotatably disposed in said bore, and having a head bearing against the top of said liner, a depending ferrule secured to said head and extending in concentric spaced relation to said liner, the lower end of said ferrule being formed with an inwardly projecting ledge movable into and out of overlapping relation with said flange upon rotation of said bushing in either direction, and a stop lug struck from said flange into the path of said ledge, and adapted to engage said ledge when said flange and said ledge are in overlapping relation to freely retain the latter in such relation.

4. A slip bushing comprising, in combination, a liner having an aperture opening therethrough, an exterior locking flange on the upper end of said liner, a bushing slidably and rotatably mounted in said aperture, and having a head bearing against the upper end of said liner, a depending peripheral locking member on said head defining a recess adapted to receive the upper end of said liner and said flange, and an inwardly projecting flange on the lower end of said member adapted upon rotation of said bushing to move under said first mentioned flange to prevent relative endwise movement of said liner and said bushing.

5. A slip bushing comprising, in combination, a liner having an aperture opening therethrough, an exterior double-lobe locking flange on the upper end of said liner, a bushing slidably and rotatably mounted in said aperture, and having a head bearing against the upper end of said liner, a depending peripheral locking member on said head defining a recess adapted to receive the upper end of said liner and said flange, and spaced inwardly projecting flanges on the lower end of said member adapted upon rotation of said bushing to move respectively under the lobes of said locking flange to prevent relative endwise movement of said liner and said bushing.

6. A slip bushing comprising, in combination, a liner having an aperture opening therethrough, an exterior locking flange on the upper end of said liner, a bushing slidably and rotatably mounted in said aperture, and having a head bearing against the upper end of said liner, a depending peripheral locking member on said head defining a recess adapted to receive the upper end of said liner and said flange, and an inwardly projecting flange on the lower end of said member adapted upon rotation of said bushing to move under said first mentioned flange to prevent relative endwise movement of said liner and said bushing, and means for limiting the rotation of said bushing to locate said flanges in overlapping relation.

7. A slip bushing comprising, in combination, a liner having an aperture opening therethrough, an exterior locking flange on the upper end of said liner, a bushing slidably and rotatably mounted in said aperture and having a head bearing against the upper end of said liner, a depending peripheral locking member on said head defining a recess adapted to receive the upper end of said liner and said flange, an inwardly projecting flange on the lower end of said member adapted upon rotation of said bushing to move under said first mentioned flange to prevent relative endwise movement of said liner and said bushing, and a stop on one of said flanges projecting into the path of the other of said flanges to locate said flanges in overlapping relation.

In testimony whereof, I have hereunto affixed my signature.

CARROLL R. ALDEN.